United States Patent
Azami

(10) Patent No.: US 9,344,853 B2
(45) Date of Patent: May 17, 2016

(54) POSITION SPECIFYING SERVER, POSITION SPECIFYING METHOD, AND RECORDING MEDIUM RECORDING POSITION SPECIFYING PROGRAM

(71) Applicant: YAHOO JAPAN CORPORATION, Tokyo (JP)

(72) Inventor: Munehiro Azami, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 115 days.

(21) Appl. No.: 14/022,516

(22) Filed: Sep. 10, 2013

(65) Prior Publication Data

US 2015/0065162 A1    Mar. 5, 2015

(30) Foreign Application Priority Data

Aug. 27, 2013    (JP) .................................. 2013-176130

(51) Int. Cl.
*H04W 4/04*        (2009.01)
*H04W 4/02*        (2009.01)

(52) U.S. Cl.
CPC .. *H04W 4/04* (2013.01); *H04W 4/02* (2013.01)

(58) Field of Classification Search
CPC ..................................................... H04W 4/04
USPC .................... 342/450, 357.2, 357.22, 357.23, 342/357.24, 357.25, 357.28, 357.34, 342/357.39, 357.44, 357.48, 357.47, 386; 455/456.1–457
See application file for complete search history.

(56) References Cited

U.S. PATENT DOCUMENTS

| | | | |
|---|---|---|---|
| 8,385,943 B1 * | 2/2013 | Han et al. | 455/456.1 |
| 2006/0087425 A1 * | 4/2006 | Haeberlen | G01S 5/0252 340/539.13 |
| 2007/0133487 A1 * | 6/2007 | Wang et al. | 370/338 |
| 2009/0286548 A1 * | 11/2009 | Coronel et al. | 455/456.1 |
| 2010/0026513 A1 * | 2/2010 | Pandey | G06K 7/0008 340/8.1 |
| 2010/0317366 A1 * | 12/2010 | Shen | G01S 19/48 455/456.1 |
| 2012/0295637 A1 * | 11/2012 | Hannuksela et al. | 455/456.1 |
| 2013/0260771 A1 * | 10/2013 | Wirola | H04W 16/18 455/446 |
| 2014/0011518 A1 * | 1/2014 | Valaee et al. | 455/456.1 |

FOREIGN PATENT DOCUMENTS

JP        B2-4840395        12/2011

* cited by examiner

*Primary Examiner* — Kamran Afshar
*Assistant Examiner* — Ather Mohiuddin
(74) *Attorney, Agent, or Firm* — Oliff PLC

(57) ABSTRACT

A position specifying server includes a storage unit, a communication unit, an estimation unit, and a specifying unit. The storage unit stores GMMs corresponding to base stations of radio waves receivable by a terminal device on each floor. The communication unit receives measured values of the radio wave strengths of the radio waves which the terminal device receives from the base stations. The estimation unit estimates a position of the terminal device for each floor based on the received measured values of the radio wave strengths and the GMMs. The specifying unit calculates the estimated values of the radio wave strengths at the estimated position of the terminal device on each floor based on the GMMs and specifies the floor on which the terminal device is present based on the calculated estimated values of the radio wave strengths and the measured values of the radio wave strengths.

17 Claims, 13 Drawing Sheets

FIG.3

| BSSID | REPRESEN-TATIVE LATITUDE | REPRESEN-TATIVE LONGITUDE | MaxRSSI | GMMFlag | RECEIVABLE FLOOR ID | ⋮ |
|---|---|---|---|---|---|---|
| aaa123bbb456 | 35.xxxxxxx | 136.xxxxxxx | -75.0 | 1 | F2, F3 | ⋮ |
| 789ccc012ddd | 35.yyyyyyy | 136.yyyyyyy | -82.0 | 1 | F2, F3, F4 | ⋮ |
| ee34ff56gg78 | 35.zzzzzzz | 136.zzzzzzz | -95.0 | 0 | F1 | ⋮ |
| ⋮ | ⋮ | ⋮ | ⋮ | ⋮ | ⋮ | ⋮ |

| FLOOR ID | FILE NAME OF FLOOR DRAWING | WIDTH OF FLOOR DRAWING | HEIGHT OF FLOOR DRAWING | LONGITUDE AND LATITUDE OF FLOOR | | | | | | | FLOOR NUMBER | |
|---|---|---|---|---|---|---|---|---|---|---|---|---|
| | | | | UPPER LEFT | | LOWER LEFT | | UPPER RIGHT | | | | |
| | | | | LATI-TUDE | LONGI-TUDE | LATI-TUDE | LONGI-TUDE | LATI-TUDE | LONGI-TUDE | | | |
| F1 | F1.png | 1824 | 1290 | 35.xx | 139.xx | 35.yy | 139.yy | 35.zz | 139.zz | | 1 | ⋮ |
| F2 | F2.png | 1824 | 1290 | 35.xx | 139.xx | 35.yy | 139.yy | 35.zz | 139.zz | | 2 | ⋮ |
| F3 | F3.png | 1824 | 1290 | 35.xx | 139.xx | 35.yy | 139.yy | 35.zz | 139.zz | | 3 | ⋮ |
| F4 | F4.png | 1824 | 1290 | 35.xx | 139.xx | 35.yy | 139.yy | 35.zz | 139.zz | | 4 | ⋮ |
| ⋮ | ⋮ | ⋮ | ⋮ | ⋮ | ⋮ | ⋮ | ⋮ | ⋮ | ⋮ | | ⋮ | ⋮ |

| FLOOR ID | NUMBER OF BSSIDs | BSSID | K | $\pi$ | $\mu_x$ | $\mu_y$ | $\Sigma_{11}$ | $\Sigma_{12}$ | $\Sigma_{22}$ | ... |
|---|---|---|---|---|---|---|---|---|---|---|
| F1 | 11 | aaa123bbb456 | 8 | 0.1 | -78.3 | -79.8 | 1 | 2 | 1 | ... |
| | | 789ccc012ddd | 8 | 0.1 | -85.6 | -86.7 | 2 | 1 | 1 | ... |
| | | ee34ff56gg78 | 8 | 0.2 | -98.1 | -97.6 | 1 | 1 | 1 | ... |
| | | ... | ... | ... | ... | ... | ... | ... | ... | ... |
| F2 | 22 | asd076jyvu89 | 8 | 0.05 | -55.3 | -54.2 | 1 | 1 | 2 | ... |
| | | qwe678hjk6yh | 8 | 0.05 | -61.5 | -61.1 | 1 | 2 | 2 | ... |
| | | zdt7ui9k3n9ha | 8 | 0.05 | -68.4 | -70.2 | 2 | 2 | 1 | ... |
| | | ... | ... | ... | ... | ... | ... | ... | ... | ... |
| ... | | | | | | | | | | |

123

POSITION SPECIFYING SERVER, POSITION SPECIFYING METHOD, AND RECORDING MEDIUM RECORDING POSITION SPECIFYING PROGRAM

CROSS-REFERENCE TO RELATED APPLICATIONS

The present application claims priority to and incorporates by reference the entire contents of Japanese Patent Application No. 2013-176130 filed in Japan on Aug. 27, 2013.

BACKGROUND OF THE INVENTION

1. Field of the Invention

The present invention relates to a position specifying server, a position specifying method, and a recording medium recording a position specifying program.

2. Description of the Related Art

In the related art, using radio waves of base stations of a wireless local area network (LAN) has been suggested for a person or the like carrying a terminal device to perform positioning in an indoor place or the like where radio waves of the global positioning system (GPS) do not reach. The positioning using a wireless LAN can be realized, for example, by comparing radio wave strengths from respective base stations with measured values of the radio wave strengths in a terminal device that uses a database storing the radio wave strengths from the respective base stations measured in advance at each place within a building. To specify a floor of a building, the device having the database stores the radio wave strengths and identification information of the base stations measured in advance in each floor in a storage unit and retrieves the radio wave strengths and the identification information of the base stations received by a terminal device performing the positioning from the storage unit. Based on the retrieval result, the device having the database selects a floor which is matched with a number of pieces of identification information of the same base station (for example, Japanese Patent No. 4840395).

In the measured value data of the radio wave strength measured in each place in a building, however, it is necessary to finely set meshes of the measurement points to improve accuracy of the positioning. Therefore, the database may be enlarged, thereby increasing a load. To determine the floor in the building using the number of floors matched with the same base station, data of all of the base stations in the building is necessary. Therefore, the database may be also enlarged.

SUMMARY OF THE INVENTION

It is an object of the present invention to at least partially solve the problems in the conventional technology.

According to one aspect of an embodiment, a position specifying server includes: a storage unit that stores GMMs corresponding to base stations of radio waves receivable by a terminal device and indicating radio wave strengths on each floor; a communication unit that receives measured values of the radio wave strengths of the radio waves which the terminal device receives from the base stations; an estimation unit that estimates a position of the terminal device for each floor based on the received measured values of the radio wave strengths and the GMMs; and a specifying unit that calculates the estimated values of the radio wave strengths at the estimated position of the terminal device on each floor based on the GMMs corresponding to the base stations and specifies the floor on which the terminal device is present based on the calculated estimated values of the radio wave strengths and the measured values of the radio wave strengths.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of a base station storage unit according to the embodiment;

FIG. 4 is a diagram illustrating an example of a floor storage unit according to the embodiment;

FIG. 5 is a diagram illustrating an example of a GMM storage unit according to the embodiment;

DETAILED DESCRIPTION OF THE PREFERRED EMBODIMENTS

Figure 1:
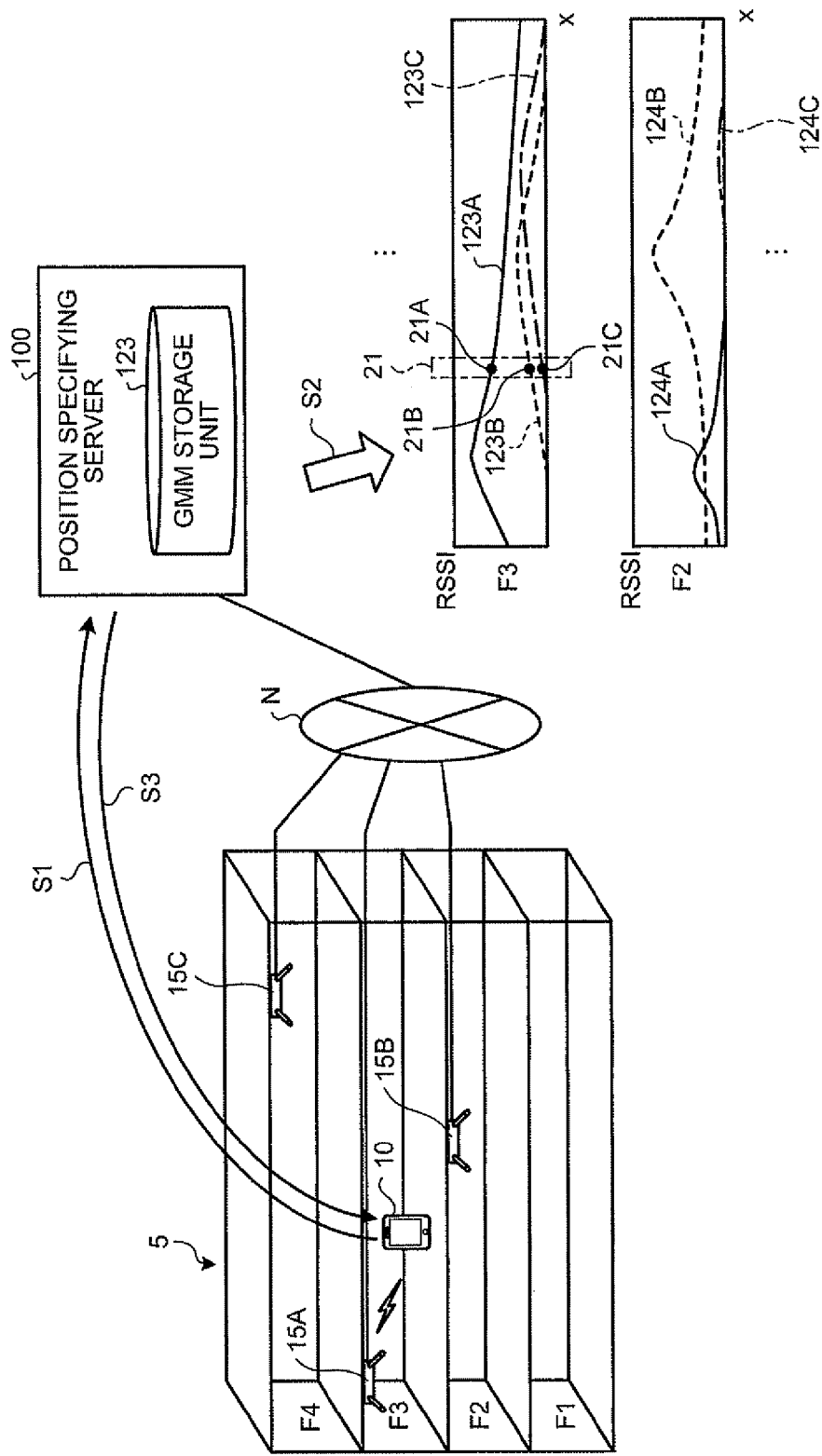
FIG. 1 is a diagram illustrating an example of a position specifying process according to an embodiment.

Hereinafter, modes (hereinafter, referred to as "embodiments") for carrying out a position specifying server, a position specifying method, and a recording medium recording a position specifying program according to the present disclosure will be described in detail with reference to the drawings. The position specifying server, the position specifying method, and the recording medium recording the position specifying program according to the embodiments of the present disclosure are not limited. Same reference numerals are given to the same constituent elements of the embodiments to be described below and the description thereof will not be repeated.

1. Overview of Position Specifying Process

Firstly, an example of a position specifying process according to an embodiment will be described with reference to FIG. 1. FIG. 1 is a diagram illustrating an example of the position specifying process according to the embodiment. In the example of FIG. 1, a terminal device 10 receives radio waves of base stations 15A to 15C and transmits basic service set identifiers (BSSIDs), which are unique IDs of the base stations 15A to 15C, and radio wave strengths (also referred to as received signal strength indicators (RSSIs)) to a position specifying server 100. The position specifying server 100 performs a position specifying process based on the received BSSIDs and the radio wave strengths. When it is not necessary to distinguish the base stations 15A to 15C, the base stations 15A to 15C are referred to as the base stations 15.

The terminal device 10 first receives the radio waves of the base stations 15A to 15C inside a building 5. The terminal device 10 detects the BSSIDs of the base stations 15A to 15C from the received radio waves and acquires a measured value of the radio wave strength of the received radio wave for each BSSID. The terminal device 10 matches the BSSIDs with the measured values of the radio wave strengths and transmits the BSSIDs and the measured values to the position specifying server 100 via a network N (step S1 indicated by an arrow in FIG. 1).

The position specifying server 100 estimates the position of the terminal device 10 for each floor of the building 5 based on the received BSSIDs, the received measured values of the radio wave strengths, and a Gaussian Mixture Model (GMM) stored in a GMM storage unit 123 (step S2). Here, the GMM expresses a radio wave strength of a base station in each floor as superposition of a plurality of Gaussian distribution functions. For example, with regard to a floor F3, a GMM 123A of the base station 15A, a GMM 123B of the base station 15B, and a GMM 123G of the base station 15C are stored in the GMM storage unit 123. For example, with regard to a floor F2, a GMM 124A of the base station 15A, a GMM 124B of the base station 15B, and a GMM 124O of the base station 15C are stored in the GMM storage unit 123.

For example, the position specifying server 100 is assumed to estimate the position of the terminal device 10 on the floor F3 and the floor F2. The position specifying server 100 estimates the position of the terminal device 10 by performing comprehensive evaluation on the position of the terminal device 10 located on the floor F3 using a particle filter based on the measured values of the radio wave strengths, the GMM 123A, the GMM 123B, and the GMM 123C. The particle filter is one of the time-series filtering methods and is a method of assuming multiple subsequent states as particles and performing tracking while predicting a weighted average as a subsequent state based on likelihood of all particles.

The position specifying server 100 estimates the position of the terminal device 10 located on the floor F3 using the particle filter. The position specifying server 100 calculates estimated values of the radio wave strengths of the base stations 15A to 15C at an estimated position 21 of the terminal device 10. The estimated value of the radio wave strength of the base station 15A can be calculated as an estimated value 21A from the GMM 123A. Likewise, the estimated value of the radio wave strength of the base station 15B can be calculated as an estimated value 21B from the GMM 123B and the estimated value of the radio wave strength of the base station 15C can be calculated as an estimated value 21C from the GMM 123C.

The position specifying server 100 calculates an existence probability of the terminal device 10 on the floor F3 based on the calculated estimated values 21A to 21C of the radio wave strengths of the base stations 15A to 15C and the measured values of the radio wave strengths of the base stations 15A to 15C. For example, the existence probability of the terminal device 10 on the floor F3 can be calculated according to a difference between the estimated values and the measured values of the radio wave strengths. With the other floors such as the floor F2, the position specifying server 100 also calculates an existence probability of the terminal device 10 on each floor such as the floor F2. Here, for example, the existence probabilities of the terminal device 10 on the floors are assumed to be 50% for the floor F3 and 10% for the floor F2.

The position specifying server 100 compares the existence probabilities of the terminal device 10 on the floors with each other. When the terminal device 10 is present at the floor with the highest probability, that is, the floor F3, the position specifying server 100 performs specifying. That is, the position specifying server 100 specifies the estimated position 21 and the floor F3 of the terminal device 10.

The position specifying server 100 transmits the specified estimated position and the specified floor of the terminal device 10 as positional information to the terminal device 10 (step S3). When the terminal device 10 receives the positional information, the terminal device 10 informs a user of the terminal device 10 of the current floor and position, for example, by displaying the position and floor on a map of the building 5 displayed on a screen.

Thus, in the position specifying process according to the embodiment, the position specifying server 100 estimates the position of the terminal device 10 for each floor of the building 5 based on the measured values of the radio wave strengths of the base stations 15R to 15C and the GMMs. When the position specifying server 100 estimates the position of the terminal device 10 for each floor, the position specifying server 100 calculates the existence probability of the terminal device 10 on the floor by comparing the measured values of the radio wave strengths at the reception position with the estimated values of the radio wave strengths calculated based on the GMMs and specifies the floor on which the terminal device 10 is present. Therefore, the user of the terminal device 10 can be informed of the current floor and position. Hereinafter, the terminal device 10, the base stations 15, the position specifying server 100 performing such a position specifying process will be described in detail.

2. Position Specifying System

Figure 2:
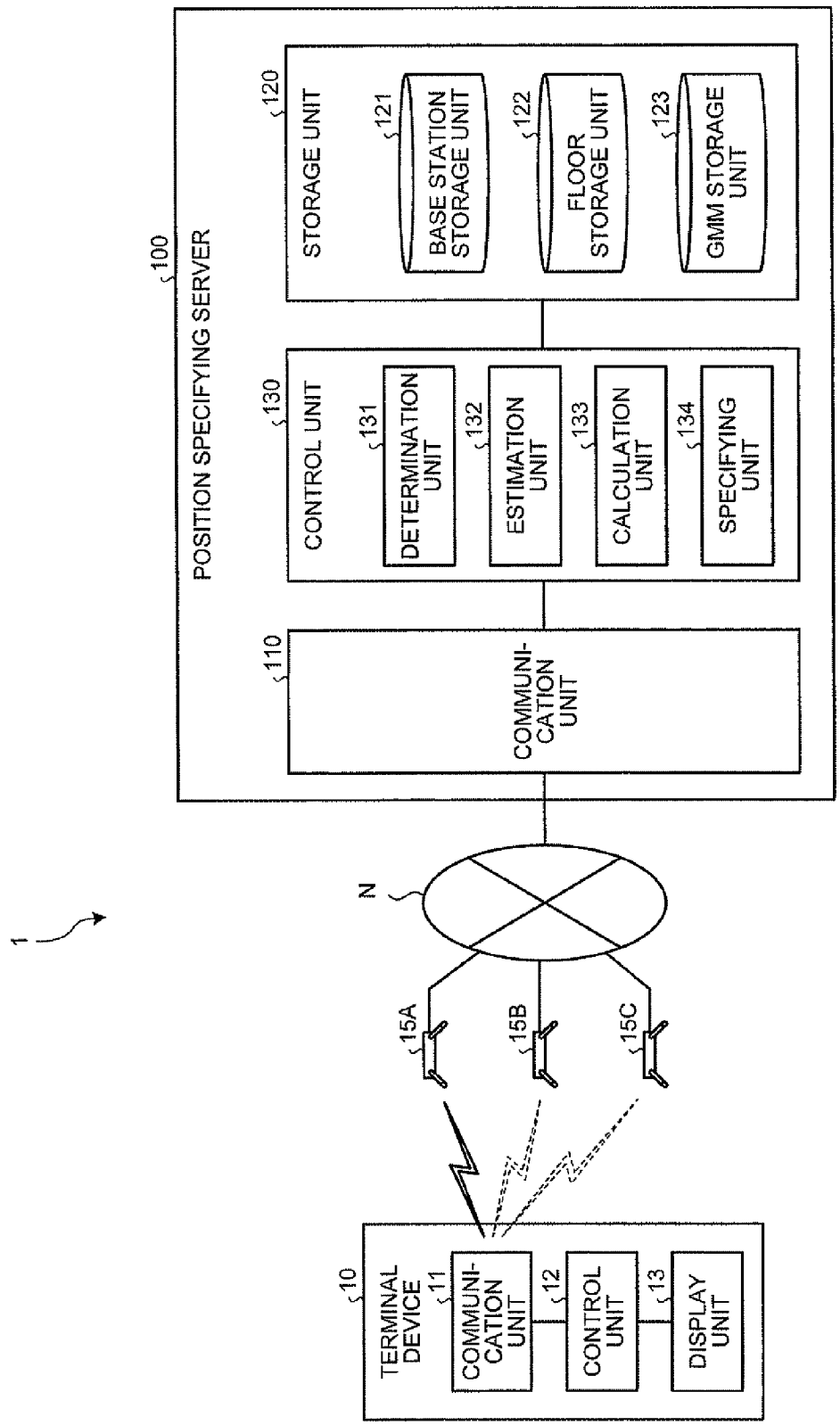
FIG. 2 is a diagram illustrating an example of the configuration of a position specifying system according to the embodiment.

Next, a position specifying system 1 according to the embodiment will be described with reference to FIG. 2. FIG. 2 is a diagram illustrating an example of the configuration of the position specifying system according to the embodiment. As illustrated in FIG. 2, the position specifying system 1 includes the terminal device 10, the base stations 15, and the position specifying server 100. The terminal device 10 and the position specifying server 100 are connected via the base stations 15 and the network N so as to perform wired or wireless communication. Although not illustrated, the terminal device 10 and the position specifying server 100 may be connected via an another base station (for example, an antenna base station of a cellular phone) independent from the base stations 15 and the network N. In FIG. 2, the example in which the position specifying system 1 includes one terminal device 10 and three base stations 15 has been described. However, the position specifying system 1 may include more terminal devices 10 and more base stations 15.

3. Configuration of Terminal Device

Next, the configuration of the terminal device 10 will be described. The terminal device 10 is an information processing device used by a user. The terminal device 10 corresponds to, for example, a cellular phone (for example, a smart phone)

or a personal digital assistant (PDA). As illustrated in FIG. 2, the terminal device 10 includes a communication unit 11, a control unit 12, and a display unit 13.

Communication Unit 11

The communication unit 11 is connected to the base stations 15 to transmit and receive information to and from the position specifying server 100 via the network N. The communication unit 11 is connected to the base stations 15 according to a wireless method. The communication unit 11 can use a wireless LAN or the like as the wireless method. The communication unit 11 detects the BSSID from the receivable radio waves from each base station 15 and acquires the measured value of the radio wave strength of the received radio waves for each BSSID.

Control Unit 12

For example, the control unit 12 is realized by, for example, a central processing unit (CPU) or a micro-processing unit (MPU) by executing a program stored in an internal storage device on a RAM serving as a working area. Further, for example, the control unit 12 is realized by an integrated circuit such as an application specific integrated circuit (ASIC) or a field programmable gate array (FPGA).

The control unit 12 matches the BSSIDs of the base stations 15 acquired by the communication unit 11 with the measured values of the radio wave strengths and transmits the BSSIDs and the measured values to the position specifying server 100 via the communication unit 11 and the network N. For example, the control unit 12 maps the positional information received from the position specifying server 100 on the map and displays the positional information on the display unit 13. The control unit 12 performs various kinds of information processing by controlling the entire terminal device 10.

Display Unit 13

The display unit 13 is a display device that displays various kinds of information. For example, the display unit 13 is realized by a liquid crystal display or the like. When a touch panel is utilized as an input unit (not illustrated), the display unit 13 and the input unit are integrated.

4. Configuration of Base Station

Next, the configuration of the base station 15 will be described. The base station 15 is, for example, a wireless base station of a wireless LAN, is connected to the terminal device 10 according to a wireless method, and is connected to the position specifying server 100 via the network N. The base station 15 conforms to, for example, IEEE 802.11a/b/g/n standards.

5. Configuration of Position Specifying Server

Next, the configuration of the position specifying server 100 will be described. The position specifying server 100 is a server device that estimates the position of the terminal device 10 for each floor based on the BSSID and the radio wave strength received from the terminal device 10 and the GMM stored in the GMM storage unit 123 to be described below. As illustrated in FIG. 2, the position specifying server 100 includes a communication unit 110, a storage unit 120, and a control unit 130. The position specifying server 100 may include an input unit (for example, a keyboard or a mouse) that receives various operations from a manager or the like of the position specifying server 100 or a display unit (for example, a liquid crystal display) that displays various kinds of information.

Communication Unit 110

The communication unit 110 is realized by, for example, a network interface card (NIC). The communication unit 110 transmits and receives information to and from the terminal device 10 via the network N and the base stations 15.

Storage Unit 120

The storage unit 120 is realized by, for example, a semiconductor memory device such as a RAM or a flash memory or a storage device such as a hard disk or an optical disc. The storage unit 120 includes a base station storage unit 121, a floor storage unit 122, and the GMM storage unit 123, The storage unit 120 stores an operating system (OS), various programs executed by the control unit 130 and various kinds of data.

Base Station Storage Unit 121

The base station storage unit 121 stores the BSSIDs or the like of the base stations 15 received by the terminal device 10. FIG. 3 is a diagram illustrating an example of the base station storage unit according to the embodiment. As illustrated in FIG. 3, the base station storage unit 121 has items such as "BSSID," "representative latitude," "representative longitude," "MaxRSSI," "GMMFlag," and "receivable floor ID."

The "BSSID" is the BSSID detected from the received radio wave of the base station 15 and is used to identify the base station 15. The "representative latitude" and the "representative longitude" indicate the latitude and the longitude of a position at which the radio wave strength is the strongest, although the radio wave strengths are measured in advance at a plurality of locations to derive a GMM parameter (the details will be described below). The "MaxRSSI" indicates the maximum measured value among the measured values of the radio wave strengths of the BSSID at the representative latitude and the representative longitude. An example of the first row in FIG. 3, for example, indicates that −75.0 dBm is measured as the radio wave strength. The "GMMFlag" indicates whether the GMM parameter used for position estimation is already derived. For example, " " indicates that the GMM parameter is derived and "0" indicates that the GMM parameter is not derived. The "receivable floor ID" indicates the floor ID of a floor on which the radio wave of the base station 15 having the BSSID can be received.

Floor Storage Unit 122

The floor storage unit 122 stores information or the like regarding the floors in the building in which positioning is performed. FIG. 4 is a diagram illustrating an example of the floor storage unit according to the embodiment. As illustrated in FIG. 4, the floor storage unit 122 has items such as "floor ID," "file name of floor drawing," "width of floor drawing," "height of floor drawing," "latitude and longitude of floor," and "floor number."

The "floor ID" is used to identify a floor. As the floor IDs, unique ID may be allocated so as to correspond to a plurality of buildings, for example. The "file name of the floor drawing" indicates a file of a floor drawing. The floor drawing is, for example, a drawing in which pillars, walls, and the like are drawn. The "width of floor drawing" and the "height of floor drawing" are the number of pixels of the floor drawing in the horizontal and vertical directions. The "latitude and longitude of the floor" is used to confirm an area of the floor and indicates, for example, the latitudes and longitudes of an upper left, a lower left, and an upper right of the floor. The "floor number" indicates which floor the floor is in the building. Based on such information, the pixel coordinates of the floor drawing and the latitude and longitude of the floor can be mutually converted.

GMM Storage Unit 123

The GMM storage unit 123 stores, for example, the BSSID and the corresponding GMM of each floor. FIG. 5 is a diagram illustrating an example of the GMM storage unit according to the embodiment. As illustrated in FIG. 5, the GMM storage unit 123 has items such as "floor ID," "number of BSSIDs," "BSSID, "K," "π," "$\mu_x$," "$\mu_y$," "$\Sigma_{11}$," "$\Sigma_{12}$," and "$\Sigma_{22}$."

The "floor ID" is used to identify a floor. The "number of BSSIDs" indicates the number of base stations 15 receivable on the floor, that is, the number of BSSIDs. The "BSSID" is used to identify the base station 15. The "K" is a GMM parameter and indicates a mixture number of normal distributions. The "π" is a GMM parameter and indicates a mixture coefficient indicating a weight of each normal distribution. A sum of all of the mixture coefficients π is 1. The "$\mu_x$" and "$\mu_y$" are GMM parameters and indicate averages of the normal distributions in the x and y directions. The "$\Sigma_{11}$," "$\Sigma_{12}$," and "$\Sigma_{22}$" are GMM parameters and indicate a variance covariance matrix of the normal distributions. Here, a GMM used to calculate the GMM parameters is expressed in Equation (1). Equation (1) is an equation that is expressed by superimposing the normal distributions even in consideration of normalization and the GMM parameters are derived based on this equation. Equation (2) expresses a conversion expression between the radio wave strength RSSI and the GMM. Coefficients α and β can be calculated according to the method of least squares (not illustrated).

$$p(x,y) \cong \Sigma_k{}^n \pi_k N(x,y|\mu_k, \sigma_k) \quad (1)$$

$$RSSI(x,y) = \alpha \cdot p(x,y) + \beta \quad (2)$$

The shape of a two-dimensional GMM is determined by an average μ, a variance covariance matrix Σ, and a mixture coefficient π of an individual normal distribution. In the position specifying server 100, a distribution of the radio wave strengths of a floor is shown using the GMM.

Here, calculation of the GMM will be described. The calculation of the GMM is based on a paper "A Wireless LAN Location Estimation Method Based on Gaussian Mixture Model" (SUSUMU FUJITA, KATSUHIKO KAJI, and NOBUO KAWAGUCHI: Journal of Information Processing Society of Japan, Vol. 52 No. 3 1069 to 1081 (March 2011)).

First, an administrator of the position specifying server 100 measures the radio wave strengths of the base stations 15 on a given floor using the terminal device 10 or another measurement device. The measurement points of the radio wave strengths are set, for example, in interval of a few meters or the like. The administrator performs the measurement a plurality of times at each measurement point and sets the average of the measurements as the radio wave strengths at the measurement point. The administrator performs conversion into a two-dimensional point distribution based on data regarding the radio wave strengths at the plurality of measurement points. The conversion into the two-dimensional point distribution is performed by dividing a region at each measurement point and distributing the number of points according to the radio wave strength to each region. In the division of the region, Voronoi division can be used.

Figure 6:
FIG. 6 is a diagram illustrating an example of a GMM according to the embodiment.

Subsequently, the point distribution is converted into a GMM using an EM algorithm. In the EM algorithm, there are two update procedures, an E step and an M step. The E step and the M step are repeated until a convergence criterion is satisfied by calculating a log likelihood function. An example of the GMM calculated in this way is illustrated in FIG. 6. FIG. 6 is a diagram illustrating an example of the GMM according to the embodiment. The GMM is a combination of Gaussian functions (bell type functions) and can be expressed as a so-called heat map with a shape of mountains. In FIG. 6, contours of the heat map, that is, the values of the same radio wave strengths or portions within predetermined ranges are illustrated by the same hatching.

Control Unit 130

Referring back to FIG. 2, the control unit 130 is realized, for example, by a CPU or an MPU by executing a program stored in an internal storage device on a RAM serving as a working area. Further, the control unit 130 is realized by, for example, an integrated circuit such as an ASIC or an FPGA.

As illustrated in FIG. 2, the control unit 130 includes a determination unit 131, an estimation unit 132, a calculation unit 133, and a specifying unit 134. The control unit 130 realizes or performs an information processing function or operation to be described below. An internal configuration of the control unit 130 is not limited to the configuration illustrated in FIG. 2, but another configuration may be realized as long as the configuration is a configuration for performing information processing to be described below.

Determination Unit 131

When the determination unit 131 receives the BSSIDs and the measured values of the radio wave strengths from the terminal device 10, the determination unit 131 counts the number of the unique BSSIDs for each floor ID, that is, each floor of the building. That is, the determination unit 131 extracts the number of BSSIDs of the base stations 15 receivable only on a given floor among the received BSSIDs with reference to the base station storage unit 121. When there is no unique BSSID, the determination unit 131 extracts a receivable floor as a feasible floor with reference to the base station storage unit 121 and outputs the floor ID and the measured value of the radio wave strength of the extracted floor to the estimation unit 132.

When there are the unique BSSIDs, the determination unit 131 determines the floor on which the number of unique BSSIDs is the maximum. When there is only one floor on which the number of unique BSSIDs is the maximum, the determination unit 131 specifies the determined floor as the floor on which the terminal device 10 is present. When there is a plurality of floors in which the number of unique BSSIDs is the maximum, the determination unit 131 specifies the floor to which the BSSID matched with the maximum measured value of the radio wave strength belongs among the unique BSSIDs, as the floor on which the terminal device 10 is present.

The determination unit 131 extracts the BSSID for which the measured value of the radio wave strength is larger than a predetermined threshold value. When the BSSID for which the measured value of the radio wave strength is larger than the predetermined threshold value is extractable, the determination unit 131 outputs the extracted BSSID to the estimation unit 132. When the BSSID for which the measured value of the radio wave strength is larger than the predetermined threshold value is not extractable, for example, the determination unit 131 lowers the predetermined threshold value by 10 dBm and extracts the BSSID again. When the BSSID for which the measured value of the radio wave strength is larger than the lowered threshold value is extractable, the determination unit 131 outputs the extracted BSSID to the estimation unit 132. When the BSSID for which the measured value of the radio wave strength is larger than the lowered threshold value is not extractable, for example, the determination unit 131 lowers the predetermined threshold value by 10 dBm and extracts the BSSID further again. When the BSSID for which the measured value of the radio wave strength is larger than the threshold value lowered twice is extractable, the determination unit 131 outputs the extracted BSSID, the floor ID of the specified floor, and the measured value of the radio wave strength to the estimation unit 132. When the BSSID for which the measured value of the radio wave strength is larger than the threshold value lowered twice is not extractable, the determination unit 131 performs an error process. Further, the determination unit 131 outputs the measured value of the radio wave strength to the calculation unit 133.

Estimation Unit 132

The estimation unit 132 receives the floor IDs, the BSSIDs, and the measured values of the radio wave strengths of the feasible floors or the specified floors from the determination unit 131. When the floor IDs of the feasible floors are input, for example, the estimation unit 132 selects one floor ID in an ascending order of the floor IDs. With regard to the floor of the input floor ID, the estimation unit 132 determines whether the BSSID for which the measured value of the radio wave strength is larger than the threshold value is extracted. When the BSSID for which the measured value of the radio wave strength is larger than the threshold value is not extracted, that is, the floor ID of the feasible floor is input, the estimation unit 132 extracts the BSSID for which the measured value of the radio wave strength is larger than the predetermined threshold value. When the BSSID for which the measured value of the radio wave strength is larger than the threshold value is extracted and the BSSID for which the measured value of the radio wave strength is larger than the predetermined threshold value is extractable, the estimation unit 132 reads the GMM parameters of the extracted BSSID on the floor from the GMM storage unit 123 and sets the GMM parameters in the particle filter.

When the BSSID for which the measured value of the radio wave strength is larger than the predetermined threshold value is not extractable or the GMM parameters cannot be set in the particle filter, for example, the estimation unit 132 lowers the predetermined threshold value by 10 dBm and extracts the BSSID again. The estimation unit 132 attempts to extract the BSSID by lowering the threshold values twice, as in the determination unit 131. When the threshold value is lowered twice and the BSSID is not extractable, the estimation unit 132 performs an error process. When the GMM parameters can be set in the particle filter, the estimation unit 132 estimates the position of the terminal device 10 using the particle filter. When the floor ID of the feasible floor is input from the determination unit 131, the estimation unit 132 outputs the estimated position of the terminal device 10 and the floor ID used in the estimation to the calculation unit 133. When the floor ID of the specified floor is input from the determination unit 131, the estimation unit 132 transmits information regarding the estimated position of the terminal device 10, the floor ID of the specified floor, the drawing of the specified floor read from the floor storage unit 122, and the like as positional information to the terminal device 10 via the communication unit 110.

Figure 7:
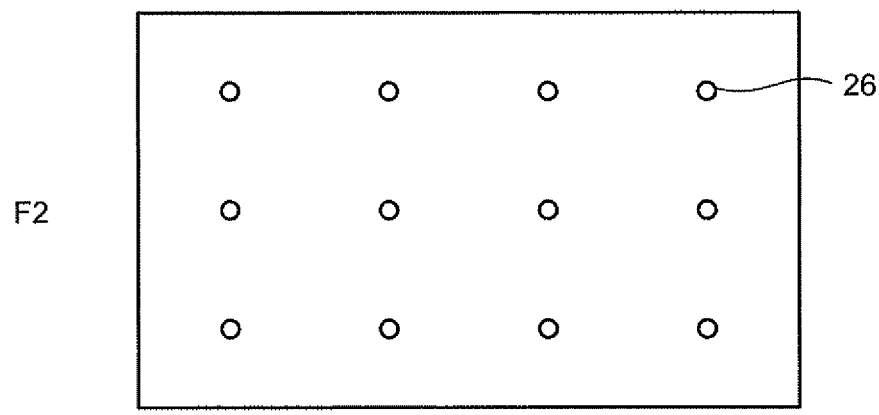
FIG. 7 is a diagram illustrating an example of an initial arrangement of particles in a position estimation process according to the embodiment.
Figure 8:
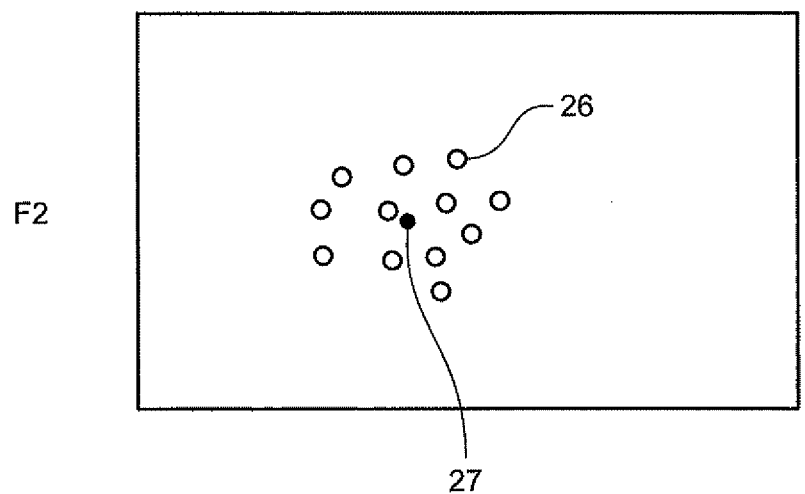
FIG. 8 is a diagram illustrating an example of the particles after rearrangement in the position estimation process according to the embodiment.

Here, estimation of the position using the particle filter will be described. FIG. 7 is a diagram illustrating an example of an initial arrangement of particles in a position estimation process according to the embodiment. In the example of FIG. 7, particles 26 are arranged evenly on the floor F2. Each particle 26 moves according to an existence probability in the GMM of the base stations 15. That is, each particle 26 performs weighting according to the existence probability and performs re-sampling in addition to random walk. When a weight of each particle 26 is treated as a probability of a place to which other particles 26 moves subsequently, most of the other particles 26 in the periphery of the particle 26 with a large weight are rearranged. FIG. 8 is a diagram illustrating an example after the rearrangement of the particles in the position estimation process according to the embodiment. In the example of FIG. 8, for example, the other particles 26 gather together in the periphery of the particle 26 with the large weight. That is, an estimated position 27 of the terminal device 10 can be estimated to be near the particle 26 with the large weight.

Calculation Unit 133

The calculation unit 133 receives the estimated position of the terminal device 10 and the floor ID from the estimation unit 132. The calculation unit 133 also receives the measured value of the radio wave strengths from the determination unit 131. The calculation unit 133 extracts the BSSID (base station 15) receivable on the floor indicated by the floor ID based on the floor ID with reference to the base station storage unit 121. The calculation unit 133 reads the GMM of the extracted BSSID from the GMM storage unit 123, calculates the radio wave strength of the BSSID at the estimated position of the terminal device 10, and sets the calculated value as an estimated value of the radio wave strength.

Figure 9:
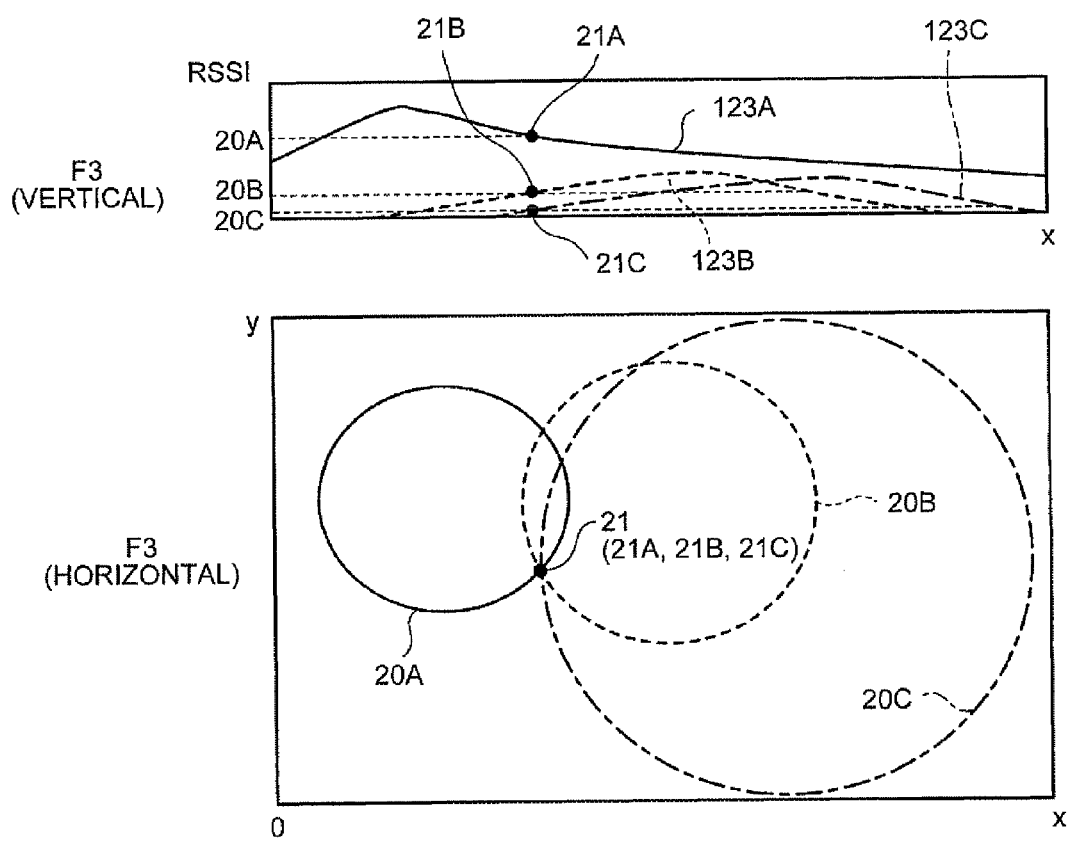
FIG. 9 is a diagram illustrating an example of an estimated-value calculation process according to the embodiment.

Here, the calculation of the estimated value of the radio wave strength of the BSSID at the estimated position of the terminal device 10 will be described. FIG. 9 is a diagram illustrating an example of an estimated-value calculation process according to the embodiment. For example, the estimated position of the terminal device 10 is assumed to be the estimated position 21, the floor ID is assumed to be F3, the base stations 15 receivable on the floor F3 are assumed to be the base stations 15A to 15C, and the GMMs corresponding to the base stations 15A to 15C are assumed to be the GMMs 123A to 123C. At this time, the calculation unit 133 calculates the estimated value 21A of the radio wave strength from the GMM 123A at the estimated position 21. Likewise, the calculation unit 133 calculates the estimated value 21B of the radio wave strength from the GMM 123E at the estimated position 21 and calculates the estimated value 21C of the radio wave strength from the GMM 123C at the estimated position 21.

The calculation unit 133 calculates the existence probabilities of the terminal device 10 on the floor based on the normal distributions from the received measured values of the radio wave strengths and the estimated values of the radio wave strengths of the respective BSSIDs at the estimated position 21. The existence probability of the terminal device 10 on the floor can be calculated, for example, according to a difference between the estimated value and the measured value of the radio wave strength. Here, in the example of FIG. 9, the measured values of the radio wave strengths are assumed to be measured values 20A to 20C. At this time, the measured values 20A to 20C are assumed to correspond to a portion with a circular shape on the GMM, as illustrated in a horizontal plane of FIG. 9. Here, there are portions in which the estimated values 21A to 21C of the radio wave strengths and the measured values 20A to 20C of the radio wave strengths overlap each other. That is, it can be said that there are rarely differences between the estimated values 21A to 21C of the radio wave strengths and the measured values 20A to 20C of the radio wave strengths. Here, the probability can be expressed as a one-dimensional normal distribution expressed in Equation (3) for each BSSID. For example, the existence probability of the terminal device 10 on the floor can be set to an average value of the probabilities of the BSSIDs, as expressed in Equation (4), in the case of a floor A in which three BSSIDs are extractable. For example, in the case of a floor B in which two BSSIDs are extractable, the probability can be set to an average value of the probabilities of the BSSIDs, as expressed in Equation (5).

$$f(RSSI, E) = \frac{1}{\sqrt{2\pi}} e^{-\frac{(RSSI-E)^2}{2}} \quad (3)$$

$$P_A = \frac{f(RSSI_{A1}, E_{A1}) + f(RSSI_{A2}, E_{A2}) + f(RSSI_{A3}, E_{A3})}{3} \quad (4)$$

$$P_B = \frac{f(RSSI_{B1}, E_{B1}) + f(RSSI_{B2}, E_{B2})}{2} \quad (5)$$

Figure 10:
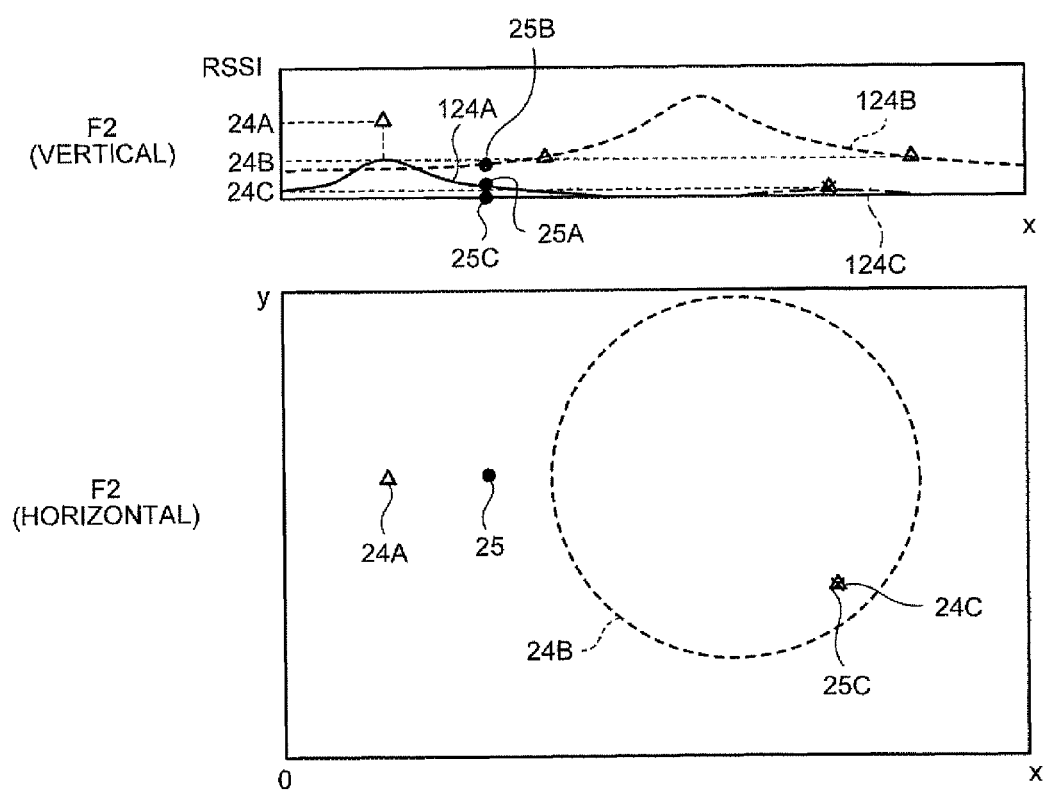
FIG. 10 is a diagram illustrating an example of an estimated-value calculation process according to the embodiment.

Here, as another example, the floor F2 is illustrated in FIG. 10. FIG. 10 is a diagram illustrating an example of an estimated-value calculation process according to the embodiment. In the example of FIG. 10, an estimated position of the terminal device 10 is assumed to be an estimated position 25 and measured values of the radio wave strengths are indicated by marks Δ and are assumed to be measured values 24A to 24C. The GMMs corresponding to the base stations 15A to 15C are assumed to be the GMMs 124A to 124C. At this time, since there is no corresponding value on the GMM 124A, the measured value 24A is the nearest value, that is, a value of a summit point of a mountain of the GMM 124A, as illustrated on a horizontal plane of FIG. 10. A position corresponding to the measured value 24B has a circular shape, as illustrated on the horizontal plane of FIG. 10 on the GMM. Further, with regard to the measured value 24C, a corresponding value on the GMM 124C is assumed to be exactly a summit point of the mountain.

The calculation unit 133 calculates an estimated value 25A of the radio wave strength from the GMM 124A at the estimated position 25. Likewise, the calculation unit 133 calculates an estimated value 25B of the radio wave strength from the GMM 124B at the estimated position 25 and calculates an estimated value 25C of the radio wave strength from the GMM 124C at the estimated position 25. At the estimated position 25, however, the radio wave strength is equal to or less than an estimation limit with regard to the GMM 124O. Therefore, for example, the calculation unit 133 sets −120 dBm as the estimated value 25C.

In the example of FIG. 10, when differences between the estimated values 25A to 25C of the radio wave strengths and the measured values 24A to 24C of the radio wave strengths are evaluated, the measured value 24A is larger between the estimated value 25A and the measured value 24A. Further, the estimated value 252 and the measured value 24B are close values, but the measured value 24B is larger. Furthermore, the measured value 24C is larger between the estimated value 25C and the measured value 24C. That is, when the existence probability of the terminal device 10 on the floor is calculated from the estimated values 25A to 25C of the radio wave strengths and the measured values 24A to 24C of the radio wave strengths using Equation (3) to Equation (5), the probability is smaller than in the example of FIG. 9.

The calculation unit 133 determines whether the position of the terminal device 10 is estimated for all of the floor IDs of the feasible floors. When the feasible floor remains, the calculation unit 133 instructs the estimation unit 132 to perform the position estimation process and the calculation process on the subsequent floor ID. When the position of the terminal device 10 is estimated for all of the feasible floors, the calculation unit 133 matches the floor ID of each floor with the calculated estimated position and the calculated existence probability of the terminal device 10 on each floor and outputs the floor ID, the estimated position, and the existence probability to the specifying unit 134.

Specifying Unit 134

When the estimated position and the existence probability of the terminal device 10 on each floor are input from the calculation unit 133, the specifying unit 134 compares the existence probabilities of the terminal device 10 on the floors with each other. The specifying unit 134 specifies the floor with the highest existence probability of the terminal device 10 among the compared floors as the floor on which the terminal device 10 is present. The specifying unit 134 transmits information regarding the estimated position of the terminal device 10, the floor ID of the specified floor, the drawing of the specified floor read from the floor storage unit 122, and the like as positional information to the terminal device 10 via the communication unit 110.

6. Position Specifying Process

Figure 11:
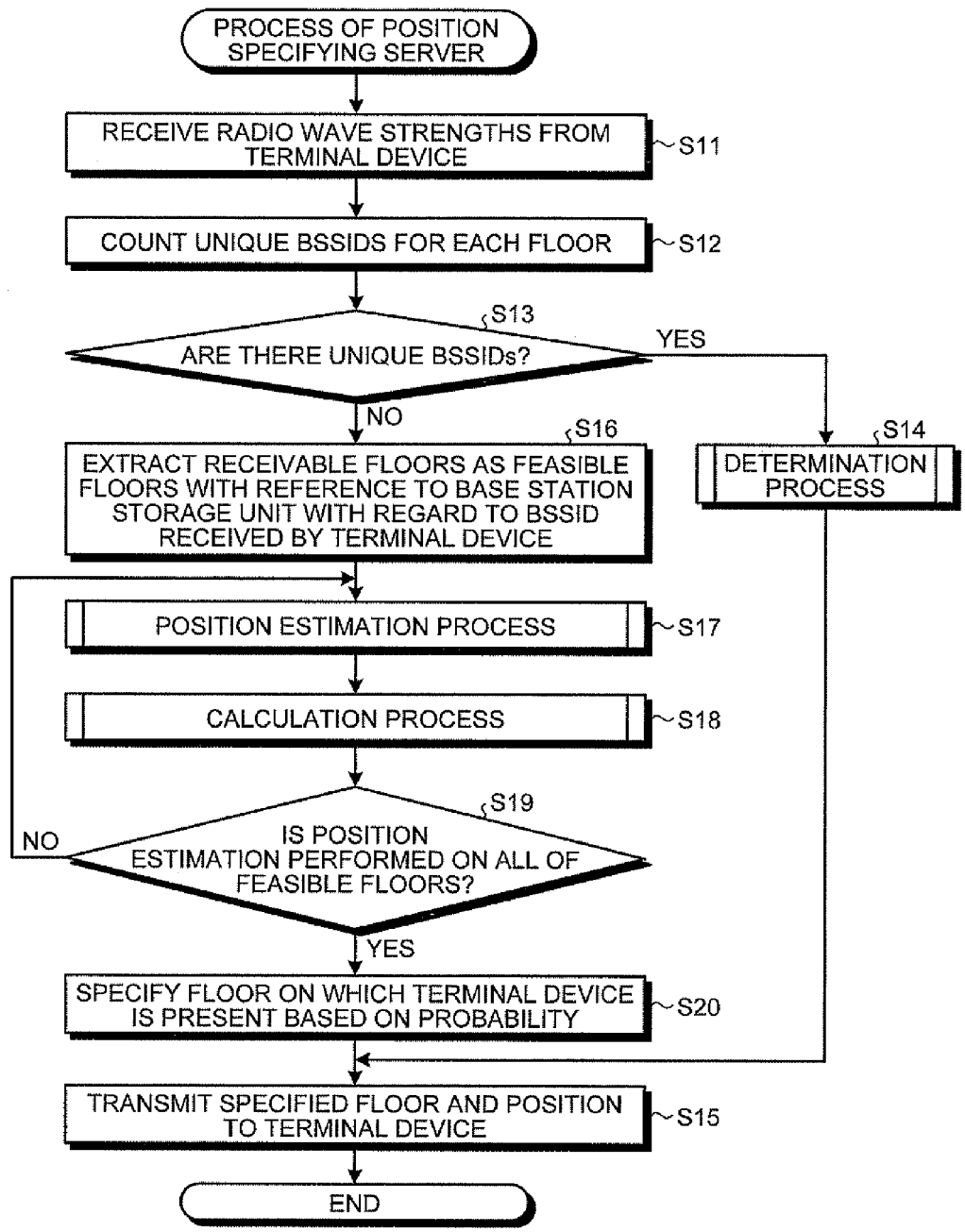
FIG. 11 is a flowchart illustrating the position specifying process performed by the position specifying server according to the embodiment.

Next, a position specifying process performed by the position specifying system 1 according to the embodiment will be described. FIG. 11 is a flowchart illustrating the position specifying process performed by the position specifying server according to the embodiment.

First, the terminal device 10 receives radio waves of the base stations 15A to 150 within the building 5. The terminal device 10 detects the BSSIDs of the base stations 15A to 150 from the received radio waves and acquires measured values of the radio wave strengths of the radio waves received for each BSSID. The terminal device 10 matches the BSSIDs with the measured values of the radio wave strengths and transmits the BSSIDs and the measured values to the position specifying server 100 via the network N.

The determination unit 131 of the position specifying server 100 receives the BSSIDs and the measured values of the radio wave strengths from the terminal device 10 (step S11). The determination unit 131 extracts and counts the number of BSSIDs (unique BSSIDs) of base stations 15 receivable on only a given floor among the received BSSIDs with reference to the base station storage unit 121 (step S12). The determination unit 131 determines whether there are the unique BSSIDs (step S13). When there is no unique BSSID (No in step S13), the determination unit 131 extracts the receivable floor as feasible floor from the received BSSIDs with reference to the base station storage unit 121 and outputs the floor ID of the extracted floor and the measured value of the radio wave strength to the estimation unit 132 (step S16). When there are the unique BSSIDs (Yes in step S13), the determination unit 131 performs a determination process (step S14).

Figure 12:
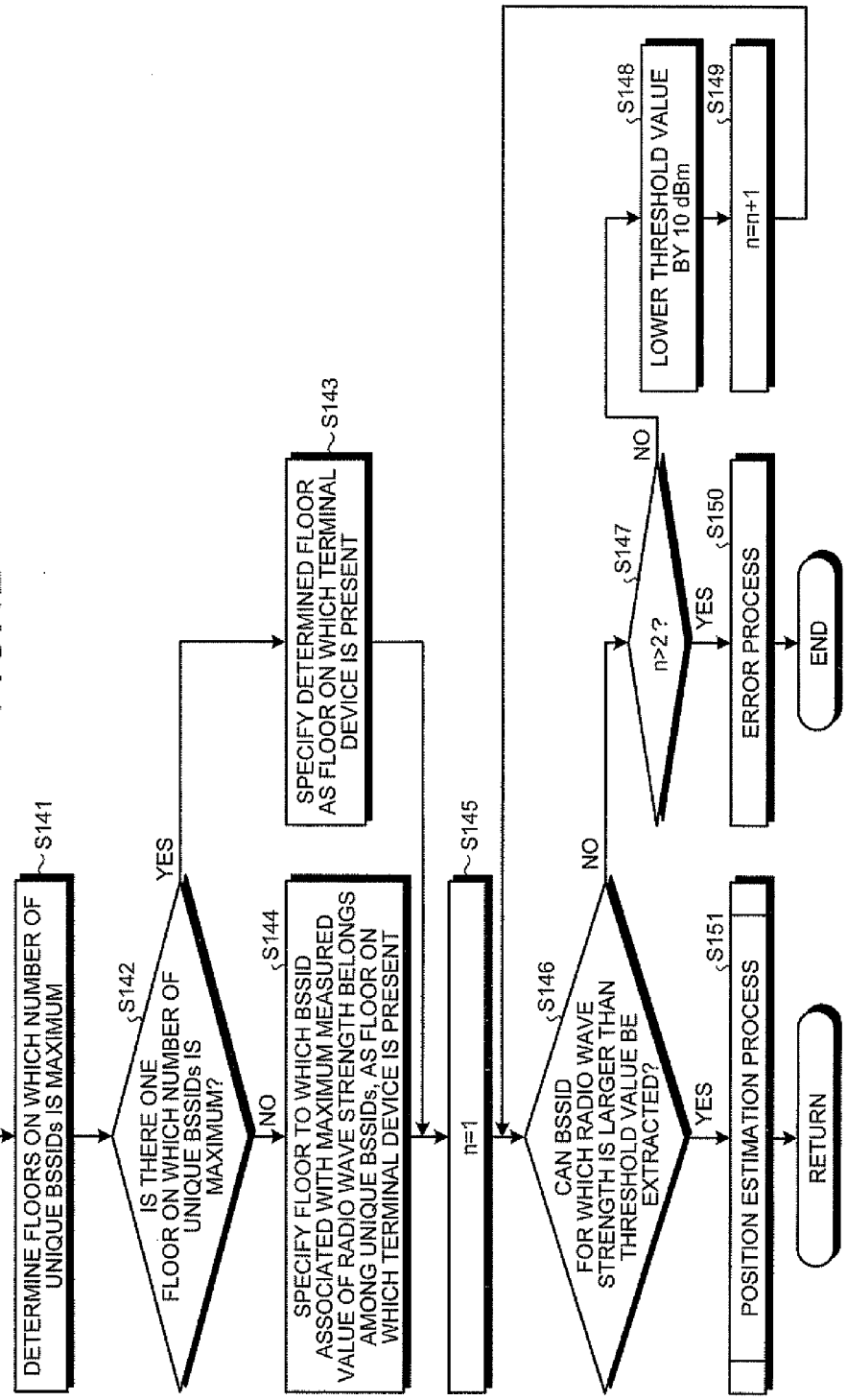
FIG. 12 is a flowchart illustrating a determination process performed by the position specifying server according to the embodiment.

Here, the determination process will be described with reference to FIG. 12. FIG. 12 is a flowchart illustrating the determination process performed by the position specifying server according to the embodiment. The determination unit 131 determines the floors in which the number of unique BSSIDs is the maximum (step S141). The determination unit 131 determines whether the number of floors in which the number of unique BSSIDs is the maximum is one (step S142). When the number of floors in which the number of unique BSSIDs is the maximum is one (Yes in step S142), the determination unit 131 specifies the determined floor as the floor on which the terminal device 10 is present (step S143). When the number of floors in which the number of unique BSSIDs is the maximum is two or more (No in step S142), the determination unit 131 specifies the floor to which the BSSID matched with the maximum measured value of the radio wave strength belongs among the unique BSSIDs, as the floor on which the terminal device 10 is present (step S144).

The determination unit 131 sets 1 as an initial value of the number of times n that the BSSID in which the radio wave strength is larger than a threshold value is attempted to be extracted (step S145). The determination unit 131 extracts the BSSID for which the measured value of the radio wave strength is larger than the predetermined threshold value. The determination unit 131 determines whether the BSSID for which the measured value of the radio wave strength is larger than the predetermined threshold value is extractable (step S146). When the BSSID for which the measured value of the radio wave strength is larger than the predetermined threshold value is extractable (Yes in step S146), the determination unit 131 outputs the extracted BSSID to the estimation unit 132 and performs the position estimation process (step S151).

When the BSSID for which the measured value of the radio wave strength is larger than the predetermined threshold value is not extractable (No in step S146), the determination unit 131 determines whether the number of times n is larger than 2 (step S147). When the number of times n is equal to or less than 2 (No in step S147), the determination unit 131 lowers the predetermined threshold value by 10 dBm (step S148), adds 1 to the number of times n (step S149), and causes the process to return to step S146 to extract the BSSID again. When the number times n is larger than 2 (Yes in step S147), the determination unit 131 performs the error process and ends the process (step S150).

The determination unit 131 repeats the processes of step S146 to step S149 to attempt to extract the BSSID by lowering the predetermined threshold value twice. At this time, when the BSSID for which the measured value is larger than the lowered threshold value is extractable (Yes in step S146), the determination unit 131 outputs the extracted BSSID to the estimation unit 132 and performs the position estimation process (step S151).

Figure 13:
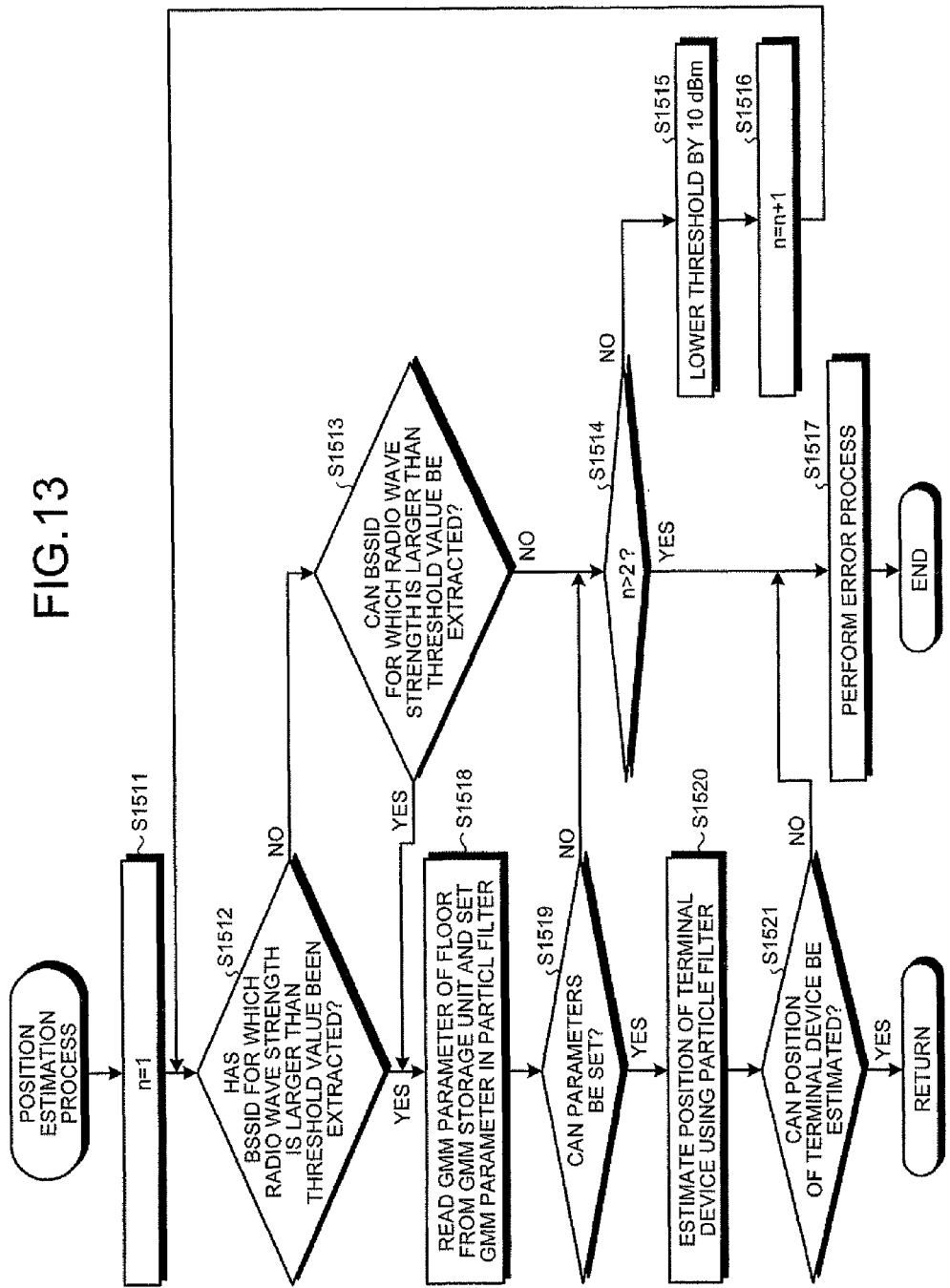
FIG. 13 is a flowchart illustrating the position estimation process performed by the position specifying server according to the embodiment.

Here, the position estimation process will be described with reference to FIG. 13. FIG. 13 is a flowchart illustrating the position estimation process performed by the position specifying server according to the embodiment. When the floor ID of the feasible floor is input from the determination unit 131, that is, the BSSID for which the measured value of the radio wave strength is larger than the threshold value is not extracted, the estimation unit 132 performs the same process as the determination process. Therefore, the estimation unit 132 sets 1 as the initial value of the number of times n that the BSSID for which the radio wave strength is larger than the threshold value is attempted to be extracted (step S1511). When the floor ID of the feasible floor is input, for example, the estimation unit 132 selects one floor ID in an ascending order of the floor IDs. When the floor ID of the specified floor is input, the estimation unit 132 selects this floor ID. With regard to the floor of the selected floor ID, the estimation unit 132 determines whether the BSSID for which the measured value of the radio wave strength is larger than threshold value is extracted (step S1512).

When the BSSID for which the measured value of the radio wave strength is larger than the threshold value is not extracted (No in step S1512), the estimation unit 132 extracts the BSSID for which the measured value of the radio wave strength is larger than the predetermined threshold value. The estimation unit 132 determines whether the BSSID for which the measured value of the radio wave strength is larger than the predetermined threshold value is extractable (step S1513). When the BSSID for which the measured value of the radio wave strength is larger than the predetermined threshold value is extractable (Yes in step S1513), the estimation unit 132 reads the GMM parameters of the extracted BSSID on the floor from the GMM storage unit 123 and sets the GMM parameters in the particle filter (step S1518).

When the BSSID for which the measured value of the radio wave strength is larger than the predetermined threshold value is not extractable (No in step S1513), the estimation unit 132 determines whether the number of times n is larger than 2 (step S1514). When the number of times n is equal to or less than 2 (No in step S1514), the estimation unit 132 lowers the predetermined threshold value by 10 dBm (step S1515), adds 1 to the number of times n (step S1516), causes the process to return to steps S1512 and S1513, and extracts the BSSID again. When the number of times n is larger than 2 (Yes in step S1514), the estimation unit 132 performs the error process and ends the process (step S1517).

When the BSSID for which the measured value of the radio wave strength is larger than the threshold value is not extracted, the estimation unit 132 repeats the processes of step S1512 to step S1516, lowers the predetermined threshold value twice, and attempts to extract the BSSID. At this time, when the BSSID for which the measured value of the radio wave strength is larger than the lowered threshold value is extractable (Yes in step S1512), the estimation unit 132 reads the GMM parameters of the extracted BSSID on the floor from the GMM storage unit 123 and sets the GMM parameters in the particle filter (step S1518).

The estimation unit 132 determines whether the GMM parameters can be set in the particle filter (step S1519). When the GMM parameters can be set in the particle filter (Yes in step S1519), the estimation unit 132 estimates the position of the terminal device 10 using the particle filter (step S1520). When the GMM parameters cannot be set in the particle filter (No in step S1519), the estimation unit 132 allows the process to proceed to step S1514, lowers the threshold value used to extract the BSSID again, and attempts to extract the BSSID for which the measured value of the radio wave strength is larger than the threshold value.

The estimation unit 132 determines whether to estimate the position of the terminal device 10 using the particle filter (step S1521). When the estimation unit 132 can estimate the position of the terminal device 10 using the particle filter (Yes in step S1521), the estimation unit 132 ends the position estimation process and the process returns to the original process. When the estimation unit 132 cannot estimate the position of the terminal device 10 using the particle filter (No in step S1521), the estimation unit 132 performs the error process and ends the process (step S1517).

After the process of step S151 in FIG. 12 ends, referring back to FIG. 11 for description, the estimation unit 132 transmits the information regarding the estimated position of the terminal device 10, the floor ID of the specified floor, the drawing of the specified floor read from the floor storage unit 122, and the like as the positional information to the terminal device 10 via the communication unit 110 (step S15). The control unit 12 of the terminal device 10 maps the positional information received from the position specifying server 100 on, for example, a map and displays the positional information on the display unit 13.

Subsequently, processes will be described after the floor ID of the receivable floor and the measured value of the radio wave strength are output to the estimation unit 132 in step S16 when there is no unique BSSID in step S13. When the floor ID of the feasible floor is input, for example, the estimation unit 132 selects one floor ID in the ascending order of the floor IDs. The estimation unit 132 performs the position estimation process with regard to the floor with the selected floor ID (step S17). Since the position estimation process of step S17 is the same as the position estimation process of step S151, the description thereof will not be repeated.

When the position estimation process ends with regard to one of the floor IDs of the feasible floors, the estimation unit 132 outputs the estimated position of the terminal device 10 and the floor ID used for the estimation to the calculation unit 133.

Figure 14:
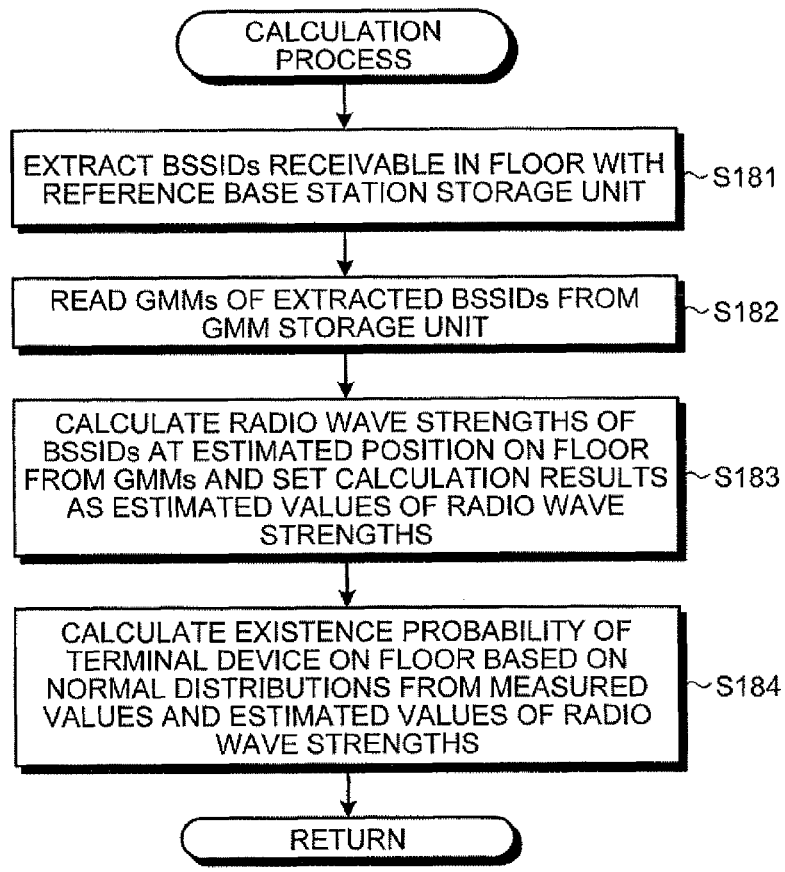
FIG. 14 is a flowchart illustrating a calculation process performed by the position specifying server according to the embodiment.

When the position of the terminal device 10 estimated by the estimation unit 132 and the floor ID are input, the calculation unit 133 performs the calculation process (step S18). Here, the calculation process will be described with reference to FIG. 14. FIG. 14 is a flowchart illustrating the calculation process performed by the position specifying server according to the embodiment.

The calculation unit 133 extracts the BSSIDs (base stations 15) receivable on the floor indicated by the floor ID based on the floor ID with reference to the base station storage unit 121 (step S181). The calculation unit 133 reads the GMMs of the extracted BSSIDs from the GMM storage unit 123 (step S182), calculates the radio wave strengths of the BSSIDs at the estimated position of the terminal device 10, and sets the calculation results as estimated values of the radio wave strengths (step S183).

The calculation unit 133 calculates the existence probability of the terminal device 10 on the floor based on the normal distributions from the measured values of the radio wave strengths input from the determination unit 131 and the estimated values of the radio wave strengths for the respective BSSIDs at the estimated position of the terminal device 10 (step S184).

Referring back to FIG. 11 for the description, the calculation unit 133 determines whether the position of the terminal device 10 is estimated for all of the floor IDs of the feasible floors (step S19). When the position of the terminal device 10 is not estimated for all of the floor IDs of the feasible floors (No in step S19), the process returns to step S17 and the calculation unit 133 performs the processes of step S17 and step S18 on the subsequent floor ID. When the position of the terminal device 10 is estimated for all of the floor IDs of the feasible floors (Yes in step S19), the calculation unit 133 associates the floor ID of each floor with the estimated position and the calculated existence probability of the terminal device 10 on each floor and outputs the floor ID, the estimated position, and the existence probability to the specifying unit 134.

When the estimated position and the existence probability of the terminal device 10 on each floor are input from the calculation unit 133, the specifying unit 134 compares the existence probabilities of the terminal device 10 on each of the floors. The specifying unit 134 specifies the floor on which the existence probability of the terminal device 10 is the highest among the compared floors as the floor on which the terminal device 10 is present (step S20). The specifying unit 134 transmits the information regarding the estimated position of the terminal device 10, the floor ID of the specified floor, the drawing of the specified floor read from the floor storage unit 122, and the like as positional information to the terminal device 10 via the communication unit 110 (step S15). The control unit 12 of the terminal device 10 maps the positional information received from the position specifying server 100 on, for example, a map and displays the positional information on the display unit 13.

7. Advantages

In this way, the position specifying server 100 stores the GMMs corresponding to the base stations receivable by the terminal device and indicating the radio wave strengths on each floor in the storage unit, receives the measured values of the radio wave strengths of the radio waves which the terminal device 10 receives from the base stations 15, and estimates the position of the terminal device 10 for each floor based on the received measured values of the radio wave strengths and the GMMs. Further, the position specifying server 100 calculates the estimated values of the radio wave strengths at the estimated position of the terminal device 10 on each floor based on the GMMs corresponding to the base stations 15 and specifies the floor on which the terminal device 10 is present based on the calculated estimated values of the radio wave strengths and the measured values of the radio wave strengths. Thus, the position specifying server 100 can specify the floor with high accuracy using a small database.

The position specifying server 100 calculates a difference between the calculated estimated value of the radio wave strength and the measured value of the radio wave strength for each base station 15, calculates an existence probability of the terminal device 10 on each floor for each of the base stations 15 according to the calculated difference in the radio wave strength, and specifies the floor on which the terminal device 10 is present based on the calculated existence probability for each base station 15. Thus, the position specifying server 100 can specify the floor with high accuracy based on the existence probability of the terminal device 10 on each floor.

The position specifying server 100 calculates the difference between the calculated estimated value of the radio wave strength and the measured value of the radio wave strength for each of the base stations 15, calculates an average value of probabilities for each base station 15 for which the difference in the radio wave strength is calculated on each floor as an existence probability of the terminal device 10 on each floor according to the calculated difference in the radio wave strength, and specifies the floor on which the terminal device 10 is present based on the calculated existence probability. Thus, the position specifying server 100 can set the average value of the existence probabilities of the terminal device 10 on each floor for each base station 15 as the existence probability of the terminal device 10 on each floor, and thus can specify the floor with high accuracy.

The position specifying server 100 stores floor-unique base station information in which floor-unique base stations (BSSID) received in advance on one floor are associated with the floor in the storage unit. The determination unit 131 determines the floor on which the number of received floor-unique base stations is the largest as the floor on which the terminal device 10 is present. When the determination unit 131 is not able to specify the floor on which the terminal device 10 is present, the position specifying server 100 specifies the floor on which the terminal device 10 is present. Thus, the position specifying server 100 can specify the floor with high accuracy through a lighter process, when there are the floor-unique base stations.

The position specifying server 100 stores floor-unique base station information in which floor-unique base stations (BSSID) received in advance on one floor are associated with the floor in the storage unit. The determination unit 131 determines the floor to which the floor-unique base station of the maximum radio wave strength of the received floor-unique base station belongs as the floor on which the terminal device 10 is present, when there is a plurality of floors in which the number of received floor-unique base stations is the largest. When the determination unit 131 is not able to specify the floor on which the terminal device 10 is present, the position specifying server 100 specifies the floor on which the terminal device 10 is present. Thus, the position specifying server 100 can specify the floor with high accuracy through a lighter process, even when there are the plurality of floor-unique base stations.

8. Others

The embodiments of the present disclosure have been described above in detail with reference to the drawings. The embodiments are merely examples and should be apparent to those skilled in the art that the aspects described in the summary of the invention and various modifications and corrections can be realized as other embodiments.

In the above-described embodiments, the calculation unit 133 uses the average value of the probabilities for each base station 15 as the existence probability of the terminal device 10 on each floor, but the invention is not limited thereto. For example, instead of the average value of the probabilities for each base station 15, the calculation unit 133 may set a value, which is obtained by dividing a sum of the probabilities for the base stations 15 by the number of base stations on the floor on which the number of base stations 15 for which the difference in the radio wave strength is calculated is the largest among the floors, as the existence probability of the terminal device 10 on each floor. That is, the position specifying server 100 calculates the difference between the calculated estimated value of the radio wave strength and the measured value of the radio wave strength for each base station 15, calculates the value, which is obtained by dividing the sum of probabilities for the base stations 15 for which the difference in the radio wave strength is calculated on each floor by the number of base stations 15 on the floor on which the number of base stations 15 for which the difference in the radio wave strength is calculated is the largest among the floors, as the existence probability of the terminal device 10 on each floor according to the calculated difference in the radio wave strength, and specifies the floor on which the terminal device 10 is present based on the calculated existence probability. Thus, the position specifying server 100 can perform weighting the floor on which the number of base stations 15 for which the difference in the radio wave strength is calculated is the largest and can specify the floor with high accuracy.

In the above-described embodiments, the determination unit 131 specifies the floor to which the BSSID for which the measured value of the radio wave strength is the maximum belongs among the unique BSSIDs, as the floor on which the terminal device 10 is present, but the invention is not limited thereto. For example, when the maximum radio wave strength of the received floor-unique BSSID (base station 15) exceeds the maximum radio wave strength of the corresponding floor-unique BSSID stored in the base station storage unit 121, the determination unit 131 can exclude the floor to which the floor-unique BSSID belongs from the specifying candidates. That is, the position specifying server 100 stores floor-unique base station information in which floor-unique base stations received in advance on one floor are associated with the floor and the maximum radio wave strength of each of the floor-unique base stations in the storage unit. The determination unit 131 excludes the floor to which the floor-unique base stations belong from the specifying candidates, when the maximum radio wave strength of the received floor-unique bases station exceeds the maximum radio wave strength of the corresponding floor-unique base station stored in the storage unit and determines the floor on which the number of received floor-unique base stations is the largest as the floor on which the terminal device 10 is present. When the determination unit 131 is not able to specify the floor on which the terminal device 10 is present, the position specifying server 100 specifies the floor on which the terminal device 10 is present. Thus, the position specifying server 100 can exclude the floor to which the base station 15 with the maximum radio wave strength exceeding the radio wave strength measured in advance belongs from the candidates, and thus can specify the floor with high accuracy with a light process.

In the above-described embodiments, the floor on which the terminal device 10 is present is specified based on the estimated value and the measured value of the radio wave strength, but the invention is not limited thereto. For example, the floor may be specified based on a measured value R of the radio wave strength measured by the terminal device 10 and the maximum radio wave strength Rimax in each floor i. First, the administrator of the position specifying system 1 calculates a difference "dji=Rj−Rimax" for each measurement point j of each floor i in advance. Based on the difference dji, the administrator calculates the maximum value of the difference dji as a parameter x1, the number of positive values of the difference dji as a parameter x2 (that is, indicates another floor), the average value of the difference dji as a parameter x3, and the average of positive values of the difference dji as a parameter x4. Further, the administrator acquires the number of BSSIDs measured in each floor i, that is, the number of base stations 15. Next, coefficients k1 to k5 are specified through discriminant analysis of multivariable analysis using Equation (6). Here, Equation (6) is 1 in a correct case and is 0 in an error case. Next, when the terminal device 10 actually performs positioning and the measured value of the measured radio wave strength measured by the terminal device 10 is assumed to be R, the position specifying server 100 can calculate a difference "di=R−Rimax," calculate the parameters x1 to x5, and specify the floor on which Equation (6) is the maximum as the floor on which the terminal device 10 is present. Thus, the position specifying server 100 can specify the floor on which the terminal device 10 is present based on the maximum radio wave strength of each floor.

$$f(xi) = k1 \cdot x1 + k2 \cdot x2 + k3 \cdot x3 + k4 \cdot x4 + k5 \cdot x5 \qquad (6)$$

The above-described position specifying server 100 may be realized by a plurality of server computers or may be realized by a single server computer. Further, an external platform is called by an application programming interface (API), network computing, or the like to be realized depending on the functions. In this way, the configuration can be flexibly changed.

Figure 15:
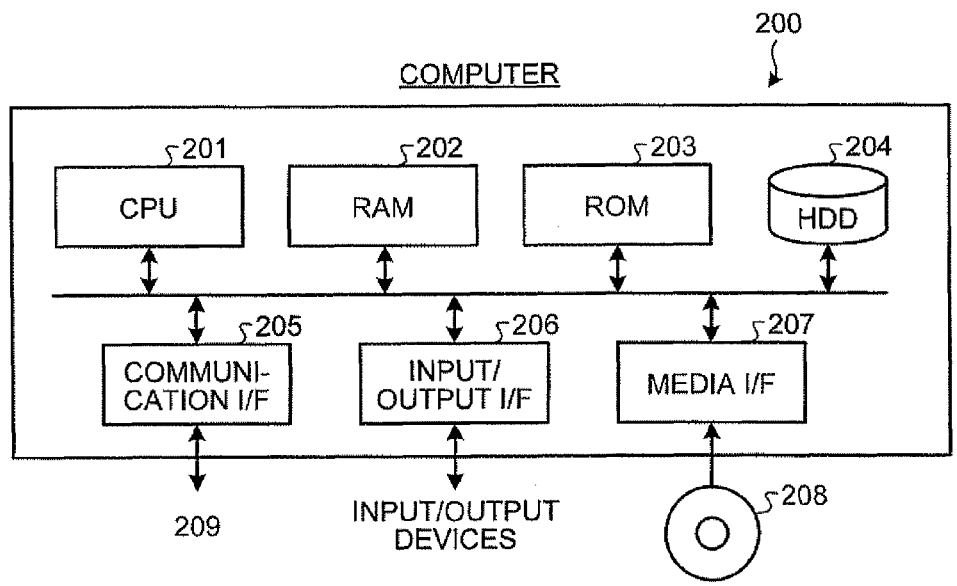
FIG. 15 is a diagram illustrating a hardware configuration of an example of a computer realizing the function of the position specifying server.

The position specifying server 100 according to the above-described embodiment is realized by, for example, a computer 200 that has a configuration illustrated in FIG. 15. FIG. 15 is a diagram illustrating an example of a hardware configuration of a computer realizing the functions of the position specifying server. The computer 200 includes a central processing unit (CPU) 201, a random access memory (RAM) 202, a read-only memory (ROM) 203, a hard disk drive (HDD) 204, a communication interface (I/F) 205, an input/output interface (I/F) 206, and a media interface (I/F) 207.

The CPU 201 operates based on a program stored in the ROM 203 or the HDD 204 and controls each unit. The ROM 203 stores, for example, a boot program performed by the CPU 201 at the time of activation of the computer 200 or a program dependent on hardware of the computer 200.

The HDD 204 stores, for example, a program executed by the CPU 201 and data used by the program. The communication interface 205 receives data from another device via a communication line 209, transmits the data to the CPU 201, and transmits data generated by the CPU 201 to another device via the communication line 209.

The CPU 201 controls an output device such as a display or a printer or an input device such as a keyboard or a mouse via the input/output interface 206. The CPU 201 acquires data from the input device via the input/output interface 206. The CPU 201 outputs generated data to the output device via the input/output interface 206.

The media interface 207 reads a program or data stored in a recording medium 208 and supplies the program or the data to the CPU 201 via the RAM 202. The CPU 201 loads the program on the RAM 202 from the recording medium 208 via the media interface 207 and executes the loaded program. The recording medium 208 is, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

When the computer 200 functions as the position specifying server 100 according to the embodiment, the CPU 201 of the computer 200 realizes the functions of the determination unit 131, the estimation unit 132, the calculation unit 133, and the specifying unit 134 by executing the program loaded on the RAM 202. The HDD 204 stores data stored in the base station storage unit 121, the floor storage unit 122, and the GMM storage unit 123.

The CPU 201 of the computer 200 reads the program from the recording medium 208 and executes the program. As another example, the CPU 201 may acquire the programs from another device via the communication line 209.

The position specifying server according to the present disclosure is capable of specifying a floor with high accuracy even using a small database.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A position specifying server for use with a terminal device, the position specifying server comprising:
   a non-transitory computer readable storage medium programmed to store Gaussian Mixture Models corresponding to base stations of radio waves receivable by the terminal device and indicating radio wave strengths on each floor; and
   a processor programmed to:
      receive measured values of the radio wave strengths of radio waves which the terminal device receives from the base stations;
      calculate a difference between the calculated estimated value of the radio wave strength and the measured value of the radio wave strength for each of the base stations;
      estimate a position of the terminal device for each floor based on the by received measured values of the radio wave strengths and the Gaussian Mixture Models by calculating a value representing an existence probability of the terminal device on each floor according to the calculated difference in the radio wave strength, which is obtained by dividing a sum of probabilities for the base station for which the difference in the radio wave strength is calculated on each floor by the number of base stations on the floor on which the number of base stations for which the difference in the radio wave strength is calculated is the largest among the floors;
      calculate an estimated value of the radio wave strengths at the estimated position of the terminal device on each floor based on the Gaussian Mixture Models; and
      specify the floor on which the terminal device is present based on the calculated estimated values of the radio wave strengths, the measured values of the radio wave strengths and the calculated existence probability.

2. The position specifying server according to claim 1, wherein the processor calculates a difference between the calculated estimated value of the radio wave strength and the measured value of the radio wave strength for each base station, calculates an existence probability of the terminal device on each floor for each of the base stations according to the calculated difference in the radio wave strength, and specifies the floor on which the terminal device is present based on the calculated existence probability for each base station.

3. The position specifying server according to claim 1, wherein the processor calculates a difference between the calculated estimated value of the radio wave strength and the measured value of the radio wave strength for each of the base stations, calculates an average value of probabilities for each base station for which the difference in the radio wave strength is calculated on each floor as an existence probability of the terminal device on each floor according to the calculated difference in the radio wave strength, and specifies the floor on which the terminal device is present based on the calculated existence probability.

4. The position specifying server according to claim 1,
   wherein the storage medium stores floor-unique base station information in which floor-unique base stations received in advance on one floor are associated with the floor,
   wherein the processor is programmed to:
      determine the floor on which the number of received floor-unique base stations is the largest as the floor on which the terminal device is present, and
   wherein, when the processor is not able to determine the floor on which the terminal device is present, the processor specifies the floor on which the terminal device is present.

5. The position specifying server according to claim 1,
   wherein the storage medium stores floor-unique base station information in which floor-unique base stations received in advance on one floor are associated with the floor and a maximum radio wave strength of each of the floor-unique base stations,
   wherein the processor is programmed to:
      exclude the floor to which the floor-unique base stations belong from specifying candidates, when the maximum radio wave strength of the received floor-unique bases station exceeds the maximum radio wave strength of the corresponding floor-unique base station stored in the storage medium, and determines the floor on which the number of received floor-unique base stations is the largest as the floor on which the terminal device is present, and
   wherein, when the processor is not able to determine the floor on which the terminal device is present, the processor specifies the floor on which the terminal device is present.

6. The position specifying server according to claim 1,
   wherein the storage medium stores floor-unique base station information in which floor-unique base stations received in advance on one floor are associated with the floor,
   wherein the processor is programmed to:
      determine the floor to which the floor-unique base station of the maximum radio wave strength of the received floor-unique base station belongs as the floor on which the terminal device is present, when there is a plurality of floors in which the number of received floor-unique base stations is the largest, and wherein, when the processor is not able to determine the floor on which the terminal device is present, the processor specifies the floor on which the terminal device is present.

7. The position specifying server according to claim 1, wherein each Gaussian Mixture Model indicates radio wave strengths on one floor, corresponding to base stations that are each placed on one of a plurality of floors.

8. The position specifying server according to claim 1, wherein the processor is programmed to calculate the estimated values of the radio wave strengths of base stations at the estimated position of the terminal device on each floor based on the Gaussian mixture model corresponding to the base stations.

9. A position specifying method of a position specifying server for use with a terminal device, the position specifying method comprising:
  storing Gaussian Mixture Models corresponding to base stations of radio waves receivable by the terminal device and indicating radio wave strengths on each floor in a non-transitory computer readable storage medium;
  receiving measured values of the radio wave strengths of radio waves which the terminal device receives from the base stations;
  estimating a position of the terminal device for each floor based on the received measured values of the radio wave strengths and the Gaussian Mixture Models; and
  calculating an estimated value of the radio wave strengths at the estimated position of the terminal device on each floor based on the Gaussian Mixture Models and specifying the floor on which the terminal device is present based on the calculated estimated values of the radio wave strengths and the measured values of the radio wave strengths, wherein
  in the specifying of the floor, (i) a difference between the calculated estimated values of the radio wave strengths and the measured values of the radio wave strength is calculated for each of the base station, (ii) a value is calculated as an existence probability of the terminal device on each floor according to the calculated difference in the radio wave strength, which is obtained by dividing a sum of probabilities for the base stations for which the difference in the radio wave strength is calculated on each floor by the number of base stations on the floor on which the number of base stations for which the difference in the radio wave strength is calculated is the largest among the floors, and (iii) the floor on which the terminal device is present is specified based on the calculated existence probability.

10. The position specifying method according to claim 9, wherein in the specifying of the floor, a difference between the calculated estimated value of the radio wave strength and the measured value of the radio wave strength is calculated for each of the base stations, an existence probability of the terminal device on each floor is calculated for each base station according to the calculated difference in the radio wave strength, and the floor on which the terminal device is present is specified based on the calculated existence probability for each base station.

11. The position specifying method according to claim 9, wherein in the specifying of the floor, a difference between the calculated estimated value of the radio wave strength and the measured value of the radio wave strength is calculated for each of the base stations, an average value of probabilities for each base station for which the difference in the radio wave strength is calculated on each floor is calculated as an existence probability of the terminal device on each floor according to the calculated difference in the radio wave strength, and the floor on which the terminal device is present is specified based on the calculated existence probability.

12. The position specifying method according to claim 9, wherein the storage medium stores floor-unique base station information in which floor-unique base stations received in advance on one floor are associated with the floor,
wherein the position specifying server further performs:
  determining the floor on which the number of received floor-unique base stations is the largest as the floor on which the terminal device is present, and
wherein when the floor on which the terminal device is present is not able to be specified in the determining of the floor, the floor on which the terminal device is present is specified in the specifying of the floor.

13. The position specifying method according to claim 9, wherein the storage medium stores floor-unique base station information in which floor-unique base stations received in advance on one floor are associated with the floor and a maximum radio wave strength of each of the floor-unique base stations,
wherein the position specifying server further performs:
  excluding the floor to which the floor-unique base stations belong from specifying candidates, when the maximum radio wave strength of the received floor-unique bases station exceeds the maximum radio wave strength of the corresponding floor-unique base station stored in the storage medium; and
  determining the floor on which the number of received floor-unique base stations is the largest as the floor on which the terminal device is present, and
wherein when the floor on which the terminal device is present is not able to be specified in the determining of the floor, the floor on which the terminal device is present is specified in the specifying of the floor.

14. A non-transitory computer readable storage medium storing a position specific program causing a computer to perform steps comprising:
  storing Gaussian Mixture Models corresponding to base stations of radio waves receivable by a terminal device and indicating radio wave strengths on each floor in the non-transitory computer readable storage medium or another non-transitory computer readable storage medium;
  receiving measured values of the radio wave strengths of radio waves which the terminal device receives from the base stations;
  estimating a position of the terminal device for each floor based on the received measured values of the radio wave strengths and the Gaussian Mixture Models;
  calculating an estimated value of the radio wave strengths at the estimated position of the terminal device on each floor based on the Gaussian Mixture Models; and
  specifying the floor on which the terminal device is present based on the calculated estimated values of the radio wave strengths and the measured values of the radio wave strengths, wherein
  in the specifying of the floor, (i) a difference between the calculated estimated value of the radio wave strength and the measured value of the radio wave strength is calculated for each of the base stations, (ii) a value is calculated as an existence probability of the terminal device on each floor according to the calculated difference in the radio wave strength, which is obtained by dividing a sum of probabilities for the base stations for which the difference in the radio wave strength is calculated on each floor by the number of base stations on the floor on which the number of base stations for which the difference in the radio wave strength is calculated is the largest among the floors, and (iii) the floor on which the terminal device is present is specified based on the calculated existence probability.

15. The non-transitory computer readable storage medium storing the position specific program according to claim 14, wherein in the specifying of the floor, a difference between the calculated estimated value of the radio wave strength and the measured value of the radio wave strength is calculated for each of the base stations, an existence probability of the terminal device on each floor is calculated for each base station according to the calculated difference in the radio wave strength, and the floor on which the terminal device is present is specified based on the calculated existence probability for each base station.

16. The non-transitory computer readable storage medium storing the position specific program according to claim 14, wherein in the specifying of the floor, a difference between the calculated estimated value of the radio wave strength and the measured value of the radio wave strength is calculated for each of the base stations, an average value of probabilities for each base station for which the difference in the radio wave strength is calculated on each floor is calculated as an existence probability of the terminal device on each floor according to the calculated difference in the radio wave strength, and the floor on which the terminal device is present is specified based on the calculated existence probability.

17. The non-transitory computer readable storage medium storing the position specific program according to claim 14,
    wherein the storage medium or the another storage medium stores floor-unique base station information in which floor-unique base stations received in advance on one floor are associated with the floor,
    wherein the computer is caused to further perform:
        determining the floor on which the number of received floor-unique base stations is the largest as the floor on which the terminal device is present, and
    wherein when the floor on which the terminal device is present is not able to be specified in the determining of the floor, the floor on which the terminal device is present is specified in the specifying of the floor.

\* \* \* \* \*